United States Patent
Peng

(10) Patent No.: US 9,648,289 B1
(45) Date of Patent: May 9, 2017

(54) DOORBELL-TRIGGERING METHOD

(71) Applicant: BRAINCHILD ELECTRONIC CO., LTD., Taipei (TW)

(72) Inventor: Tsu-Yi Peng, Taipei (TW)

(73) Assignee: BRAINCHILD ELECTRONIC CO., LTD., Taipei (TW)

( * ) Notice: Subject to any disclaimer, the term of this patent is extended or adjusted under 35 U.S.C. 154(b) by 0 days.

(21) Appl. No.: 15/206,812

(22) Filed: Jul. 11, 2016

(30) Foreign Application Priority Data

May 4, 2016 (TW) .............................. 105113890 A

(51) Int. Cl.
*H04N 7/15* (2006.01)
*H04N 7/18* (2006.01)

(52) U.S. Cl.
CPC ................................... *H04N 7/186* (2013.01)

(58) Field of Classification Search
None
See application file for complete search history.

(56) References Cited

U.S. PATENT DOCUMENTS

| 8,780,201 B1* | 7/2014 | Scalisi | H04N 7/186 348/143 |
| 2014/0210590 A1* | 7/2014 | Castro | G07C 9/00563 340/5.52 |

* cited by examiner

*Primary Examiner* — Creighton Smith
(74) *Attorney, Agent, or Firm* — Chun-Ming Shih; HDLS IPR Services

(57) ABSTRACT

A doorbell-triggering method first controls the doorbell trigger to switch to a hardware shutdown status when detecting the doorbell trigger is idle; controls the doorbell trigger to switch to an operating booting status to connect to a relay host when receiving a doorbell signal from a button unit of the doorbell trigger under the hardware shutdown status; sends a visiting message to a remote electronic device via the relay host; receives a return image/text message from the relay host and displaying the return image/text message on a display unit of the doorbell trigger. The present disclosed example can substantially reduce the power consumption and the requirement of network bandwidth via automatically switching to the hardware shutdown status when idle and using the image/text message having smaller data size to respond the visitor.

6 Claims, 5 Drawing Sheets

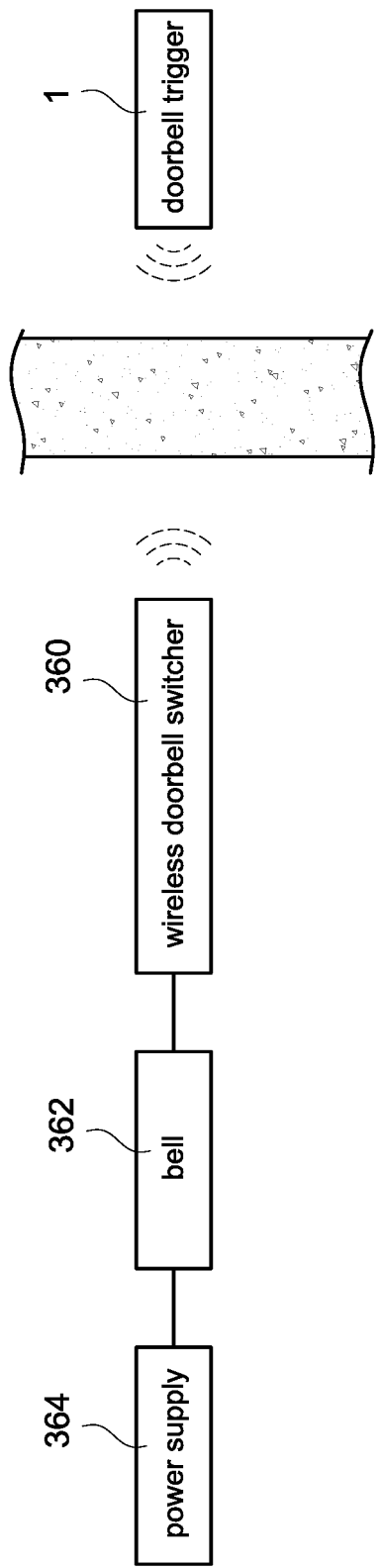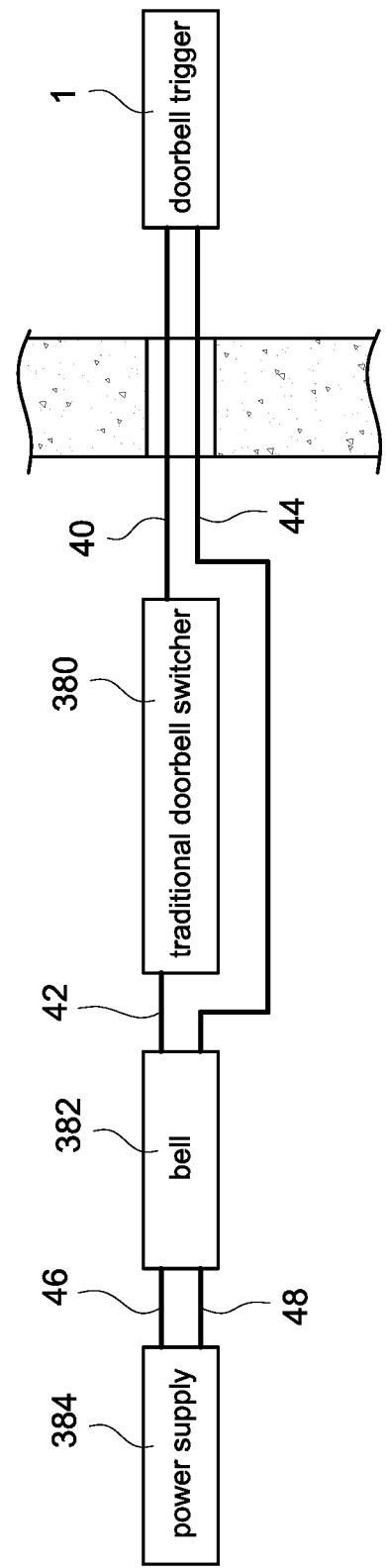
FIG.2
FIG.3

DOORBELL-TRIGGERING METHOD

BACKGROUND OF THE INVENTION

Field of the Invention

The technical field relates to triggering method and more particularly related to doorbell-triggering method.

Description of Related Art

When sensing that a visitor is coming, the remote intelligence doorbell of the related art can automatically capture audio/video data of the visitor via using an audio/video device, such as microphone or camera, and send the audio/video data to an electronic device of a household for playback. Additionally, after watching the audio/video data, the household can send audio/video data of the household to the remote intelligence doorbell for playback (such as playing via display or speaker of the remote intelligence doorbell) and instantly responding to the visitor.

Although the remote intelligence doorbell of the related art using real-time audio/video transmission can render the household to instantly respond to the visitor, however, when using the battery as the power source, the remote intelligence doorbell of the related art will need to frequently replace the battery because of the large power consumption of the audio/video device. When using the mains electricity supply as the power source, the installation of the remote intelligence doorbell of the related art will be extremely difficult and the installing position will be limited because of needing to connect the mains electricity supply.

Besides, a large stable network bandwidth is needed for making the remote intelligence doorbell of the related art work normally because of the large data size of audio/video data. Once the network signal quality is poor, there is great probability of failing to transfer the audio/video data and communication problem between the visitor and the household.

Besides, the remote intelligence doorbell of the related art has very long booting/shutdown time (larger than 10 seconds) because of using the architecture of SoC (System on Chip), and must operate under the operating status anytime (In other words, the remote intelligence doorbell of the related art must continuously operate under the large power consumption status) for preventing from failing to instantly respond the visitor.

SUMMARY OF THE INVENTION

The disclosure is directed to a doorbell-triggering method, the method can reduce the power consumption and the requirement of network bandwidth.

One of the exemplary embodiments, a doorbell-triggering method, comprises:

a) controlling a doorbell trigger to switch to a hardware shutdown status when detecting the doorbell trigger is idle;

b) controlling the doorbell trigger to switch to an operating booting status and connect to a relay host when receiving a doorbell signal from a button unit of the doorbell trigger under the hardware shutdown status;

c) sending a visiting message to a remote electronic device via the relay host; and d) receiving a return image/text message from the relay host and displaying the return image/text message on a display unit of the doorbell trigger.

The present disclosed example can substantially reduce the power consumption and the requirement of network bandwidth via automatically switching to the hardware shutdown status when the doorbell trigger is idle and using the image/text message having smaller data size to respond to the visitor.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

FIG. 2 is a connecting schematic view of a doorbell trigger according to a second embodiment of the present disclosed example;

FIG. 3 is a connecting schematic view of a doorbell trigger according to a third embodiment of the present disclosed example;

DETAILED DESCRIPTION OF THE INVENTION

In cooperation with the attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
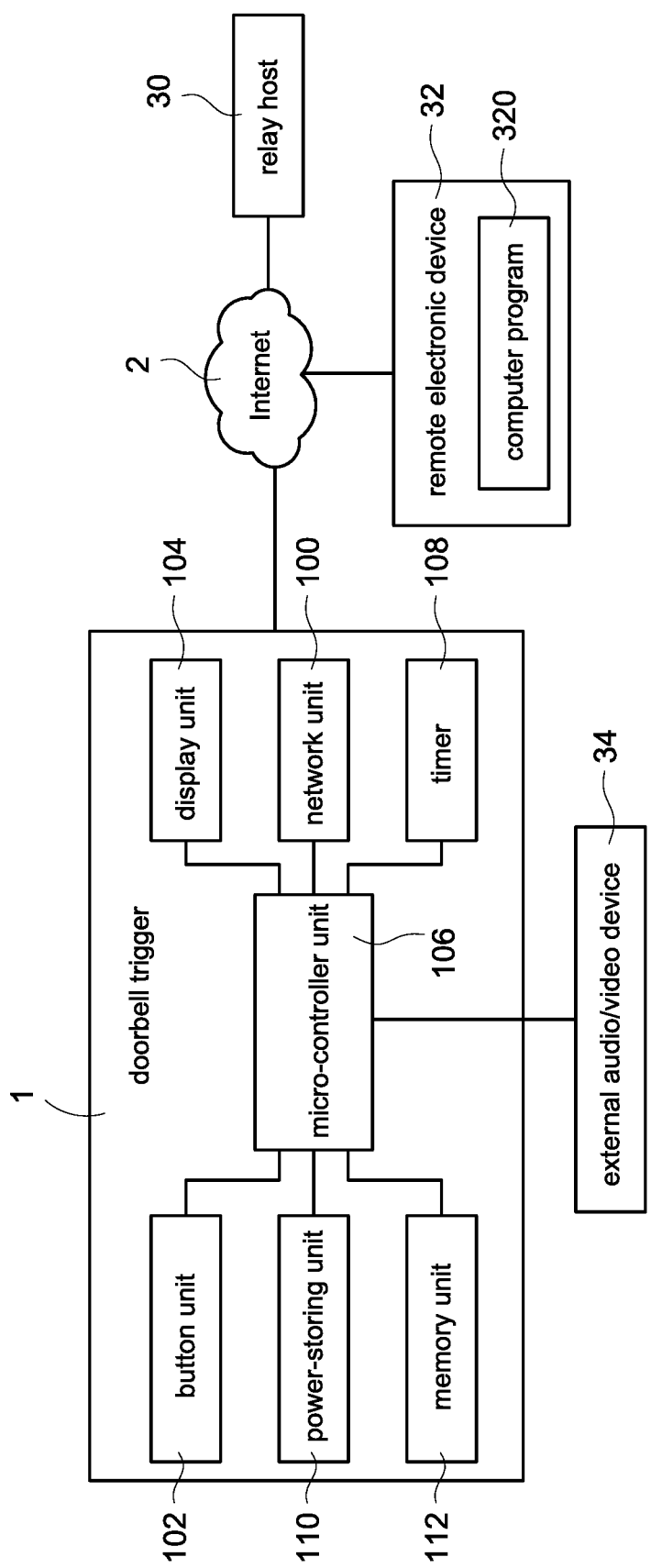
FIG. 1 is an architecture diagram of a doorbell trigger according to a first embodiment of the present disclosed example.

First, please refer to FIG. 1, which illustrates an architecture diagram of a doorbell trigger according to a first embodiment of the present disclosed example. As shown in the figure, the doorbell trigger 1 of the present disclosed example mainly comprises a network unit 100, a button unit 102, a display unit 104 and a micro-controller unit (MCU) 106 electrically connected to above-mentioned elements.

The network unit 100 is used to connect to the Internet 2 via wire(s) or wireless, such as connecting to the Internet 2 via a router of a residence. Besides, the network unit 100 can connect to a relay host 30 (the relay host 30 can be corresponded to a fixed Internet Protocol (IP) address or a fixed domain name, such as URL (Uniform Resource Locator) or web address) via the Internet 2, and further connect to a remote electronic device 32 hold by a household via the relay host 30. Preferably, the network unit 100 is Ethernet unit, Wi-Fi unit or Bluetooth low energy (BLE) unit, but this specific example is not intended to limit the scope of the present disclosed example. Furthermore, when the network unit 100 is BLE unit, the network unit 100 can connect to a Bluetooth network device, such as smart phone, notebook, tablet or other electronic device having capacity for simultaneously connecting Bluetooth network and Internet, and connect to the Internet 2 via the connected Bluetooth network device.

Please be noted that even the doorbell trigger 1 and the remote electronic device 32 are corresponded to the dynamic IP addresses, the present disclosed example can establish a connection between the doorbell trigger 1 and the remote electronic device 32 via using the relay host 30 corresponding to fixed IP address or fixed domain name as the connecting relay point between the doorbell trigger 1 and the remote electronic device 32.

The button unit 102 is used to receive a press operation from a visitor, and triggers a doorbell signal when sensing that it's pressed. Preferably, the button unit 102 is mechanical button or capacitive button, but this specific example is not intended to limit the scope of the present disclosed example.

The display unit 102 is used to display an image/text message. More specifically, the display unit 104 has the characteristics of low energy, low display frame rate and/or less displayable color scale (such as halftone or grayscale). Preferably, the display unit 104 is dot matrix display, reflective LCD or other low energy display, but this specific example is not intended to limit the scope of the present disclosed example.

The micro-controller unit 106 can control the doorbell trigger 1 to switch to a hardware shutdown status when detecting the doorbell trigger 1 is idle. Additionally, the micro-controller unit 106 controls the doorbell trigger 1 to switch to an operating booting status from the hardware shutdown status for recovering to operate when receiving the doorbell signal from a button unit 102 of the doorbell trigger 1 under the hardware shutdown status. After recovering, the micro-controller unit 106 sends a visiting message to the remote electronic device 32 hold by the household for noticing the household that the visitor had come via the Internet 2 and the relay host 30.

Then, the micro-controller unit 106 continually detects whether a return image/text message is received from the relay host 30, and displays the received return image/text message on the display unit 104 for responding to the visitation of the visitor when receiving the return image/text message.

Preferably, above-mentioned return image/text message is sent by remote electronic device 32, and forwarded to the micro-controller unit 106 of the doorbell trigger 1 by the relay host 30 via the Internet 2.

Preferably, above-mentioned image/text message (such as above-mentioned return image/text message or default image/text message in following description) is communication service message; above-mentioned communication service message is expressed in the form of image or text to instruct the visitor to use a specific communication service to communicate with the remote electronic device 32.

For example, above-mentioned communication service can be instant messaging service (such as Skype, Line or Facebook message), and the communication service message can be a two-dimension barcode (such as QR code) embedded with an instant messaging account of the household. After the visitor uses a visitor electronic device hold by the visitor to scan the two-dimension barcode, the visitor can use the visitor electronic device to instantly message with the remote electronic device 32 of the household.

In another example, above-mentioned communication service can be Web Real-Time Communication (Web RTC) service. Preferably, above-mentioned communication service can provide an anonymity function (such as OpenTokRTC service) so as to provide the visitor and the household that instant messaging without registration. For implementing the anonymous instant messaging, above-mentioned communication service message comprises a web address of the Web RTC service and the verification codes, wherein the web address is used for connecting to above-mentioned communication service, the verification codes are used for verification in the communication service.

More specifically, after the display unit 104 of the doorbell trigger 1 displayed the web address of the Web RTC service and the verification codes, the visitor can use his/her visitor electronic device to input the displayed web address to web browser for opening the webpage of the Web RTC service, and input the displayed verification codes in the opened webpage. Then, after passing the verification, the visitor can directly instantly message with the household via the opened webpage.

Furthermore, after finishing the communication each time, the household can vary the verification codes for preventing the third person from harassing the household (such as sending advertising messages) via using above-mentioned Web RTC service after retrieving the verification codes.

Besides, because the Web RTC service used in the present disclosed example only needs to input the verification codes to instantly message without additional registration (In other words, do not need to input personal data.), the present disclosed example not only can dispense with the registration procedure, but also effectively prevent the household and the visitor from leaking their personal data.

The present disclosed example can substantially reduce the power consumption and the requirement of network bandwidth via automatically switching to the hardware shutdown status when the doorbell trigger is idle and responding to the visitor using the image/text message having smaller data size.

Please be noted that the doorbell trigger of the related art generally uses the architecture of SoC (System on Chip). Since the SoC architecture has very long booting/shutdown time (larger than 10 seconds), the doorbell trigger of the related art is unable to fast switch from the hardware shutdown status to the operating booting status. As a result, in the application of doorbell, the doorbell trigger of the related art is unable to satisfy the requirement of instantly responding the visitor and saving power. To solve this problem, the present disclosed example replaces the SoC architecture with micro-controller unit 106 to execute computation and processing of the doorbell trigger 1 according to the characteristic of micro-controller unit that rapidly on/off (only need tens to hundreds milliseconds). Above-mentioned improvement can make the micro-controller unit 106 switch to the hardware shutdown status for reducing power consumption when it is idle, fast switch to the operating booting status from the hardware shutdown status when it is not idle, and satisfy the requirement of instantly responding the visitor and saving power.

Preferably, the micro-controller unit 106 can switch off the power of most hardware of the doorbell trigger 1 and make the doorbell trigger 1 switch to the hardware shutdown status via executing a hibernating program. Furthermore, the micro-controller unit 106 can further switch off the processor clock of the micro-controller unit 106, clean the cash memory (such as L2 cache) or reduce the voltage supply of the micro-controller unit 106 for further reducing power consumption via deep sleeping. Additionally, the micro-controller unit 106 can control the hardware of the doorbell trigger 1 which its power had been switched off to recover to operate and make the doorbell trigger 1 switch to the operating booting status via executing an awaking program.

In another embodiment of the present disclosed example, the doorbell trigger 1 further comprises a timer 108 electrically connected to the micro-controller unit 106. The micro-controller unit 106 continually counts a default timeout time via the timer 108. If the micro-controller unit 106 determines that there is no transferred data or triggered doorbell signal within the default timeout time, the micro-controller unit 106 determines that the doorbell trigger 1 is idle. If the micro-controller unit 106 determines that there is any transferred data or triggered doorbell signal within the default timeout time, the micro-controller unit 106 determines that the doorbell trigger 1 is not idle and re-counts the default timeout time.

In another embodiment of the present disclosed example, after receiving the doorbell signal, the micro-controller unit 106 can count a trigger time length of the doorbell signal being continuously triggered, or count the number of trigger times or a trigger frequency of the doorbell signal being continuously triggered during a trigger time interval via the timer 108. Additionally, the doorbell trigger 1 can send the counted trigger time length, the counted the number of trigger times or the trigger frequency to the remote electronic device 32 via the internet 2 and relay host 30.

Thus, the household can know the status of the visitor pressing the doorbell via the hold remote electronic device 32, and analyze the purpose of the visitor. For example, if the trigger time length is extreme short or the trigger times is 1 time (just once), the household can determine that the current visitor mistakenly triggers the doorbell or is for mischief, and the household can disregard the trigger event. If the trigger time length is extreme long, the trigger times is many times or the trigger frequency is extreme high, the household can determine that the current visitor has a high emergency level (such as express or disaster notification), and the household can instantly respond the trigger event.

More specifically, in another embodiment of the present disclosed example, the doorbell trigger 1 further comprises a memory unit 112. The memory unit 112 is electrically connected to the micro-controller unit 106 and used to store data.

More specifically, the memory unit 112 stores a plurality of emergency level messages respectively corresponding to a plurality of different emergency level, for example, the least level 1 represents un-emergency, the top level 5 represents most emergency. The micro-controller unit 106 can further automatically determine the emergency level of the current visitor according to the trigger time length, the number of trigger times or the trigger frequency (such as determining whether the trigger time length is greater than a specific threshold trigger time length, determining whether the number of trigger times is greater than a specific threshold number of trigger times or determining whether the trigger frequency is greater than a specific threshold trigger frequency), read out the emergency level message corresponding to the determined emergency level from the memory unit 112, and send the read emergency level message to the remote electronic device 32 via the Internet 2 and the relay host 30.

Via classifying the visitor by the emergency level messages, the present disclosed example can make the household cleanly know the emergency level of the current visitor, and instantly effectively determine whether the household must immediately respond to the current visitor.

In another embodiment of the present disclosed example, a default image/text message pre-configured by the household is stored in the memory unit 112. The micro-controller unit 106 counts a default return time after the visiting message was sent. And, the micro-controller unit 106 automatically reads out the default image/text message from the memory unit 112 and displays the read default image/text message on the display unit 104 when determining that the doorbell trigger 1 didn't receive the return image/text message from the relay host 30 and the remote electronic device 32 for the default return time since the visiting message was sent.

Thus, the doorbell trigger 1 of the present disclosed example can automatically respond to the visitor and prevent the visitor from waiting in vain, even the household is unable/inconvenient to respond the visitor currently (such as there is no network signal at the position where the household located or the household is in meeting currently).

In another embodiment of the present disclosed example, the doorbell trigger 1 further comprises a power-storing unit 110, such as battery. The power-storing unit 110 is electrically connected to the micro-controller unit 106 and used to pre-store and provide the power of keeping the doorbell trigger 1 operating.

Please be noted that even the doorbell trigger 1 of the present disclosed example uses the power-storing unit 110 as the main power source rather than the mains electricity supply, the doorbell trigger 1 of the present disclosed example still can keep operating for a long time and doesn't need to frequently replace the power-storing unit 110 or charge because the power consumption of the doorbell trigger 1 of the present disclosed example is extremely low via above-mentioned power-saving mechanism (such as switching to the hardware shutdown status when idle or the low energy display unit 104). In this embodiment, the installation of the doorbell trigger 1 of the present disclosed example becomes easier because the doorbell trigger 1 does not need to use the mains electricity supply.

In another embodiment of the present disclosed example, the doorbell trigger 1 is electrically connected to an external audio/video device 34 (such as camera, microphone, speaker, color display or any combination of above-mentioned elements). The external audio/video device 34 is installed in the entrance of the house. After the remote electronic device 32 executes the computer program 320, the household can input an audio/video-communication-enabling operation to the remote electronic device 32 so as to make the remote electronic device 32 send an audio/video-communication-enabling message to the doorbell trigger 1 via the Internet 2 and the relay host 30. Then, the doorbell trigger 1 controls the external audio/video device 34 to switch on according to the received audio/video-communication-enabling message.

After the external audio/video device 34 switched on, the household can use the remote electronic device 32 to establish an audio/video communication connection with the external audio/video device 34 via the doorbell trigger 1, retrieve an audio/video data of the entrance of the residence via the established audio/video communication connection, and play the retrieved audio/video data on the remote electronic device 32. Or, the household can use the remote electronic device 32 to send an audio/video data of the household to the external audio/video device 34 for playback.

Although the doorbell trigger 1 controls the external audio/video device 34 to switch on according to the audio/video-communication-enabling message sent from the remote electronic device 32 in this embodiment, but this specific example is not intended to limit the scope of the present disclosed example.

In another embodiment of the present disclosed example, the doorbell trigger 1 can automatically control the external audio/video device 34 to switch on without the audio/video-communication-enabling message every time receiving the doorbell signal.

In another embodiment of the present disclosed example, the external audio/video device 34 is directly connected to the Internet 2, the household can use the remote electronic device 32 to directly connect to the external audio/video device 34 (such as using P2P connecting technology) via the Internet 2 rather that additionally controlling via the doorbell trigger 1.

Please refer to FIG. 2, which illustrates a connecting schematic view of a doorbell trigger according to a second embodiment of the present disclosed example. As shown in the figure, the doorbell trigger 1 of this embodiment further wirelessly connects to the wireless doorbell switcher 360. The wireless doorbell switcher 360 is electrically connected to the bell 362. The bell 362 is electrically connected to a power supply 364 used to provide the power of keeping the bell 362 operating. More specifically, the doorbell trigger 1 further comprises a wireless unit (not shown in the figure) electrically connected to the micro-controller unit 106. The micro-controller unit 106 of the doorbell trigger 1 establishes a wireless connection with the wireless doorbell switcher 360 via the wireless unit.

When detecting that the doorbell signal was triggered, the doorbell trigger 1 can send the triggered doorbell signal to the wireless doorbell switcher 360 for controlling the wireless doorbell switcher 360 to switch on and controlling the bell 362 to ring.

Thus, the doorbell trigger 1 of the present disclosed example can simultaneously notify the household located in the residence via controlling the bell 362 to ring when the button unit 102 is pressed.

Please simultaneously refer to FIG. 1 and FIG. 3, FIG. 3 illustrates a connecting schematic view of a doorbell trigger according to a third embodiment of the present disclosed example. As shown in the figures, the doorbell trigger 1 of this embodiment further connects to a traditional doorbell switcher 380 via the traditional doorbell wires. More specifically, the micro-controller unit 106 of the doorbell trigger 1 is electrically connected to the traditional doorbell switcher 380 via physical cables 40, 44. Additionally, the traditional doorbell switcher 380 is electrically connected to a bell 382. The bell 382 is electrically connected to a power supply used to provide the power of keeping the bell 382 operating.

As shown in the figures, when the doorbell signal is not triggered, because a circuit loop (hereinafter first circuit loop for abbreviation) consisted of the doorbell trigger 1, the traditional doorbell switcher 380, the bell 382 and the cables 40-44 is open circuit, the bell 382 is unable to retrieve power from the power supply 384 via a circuit loop (hereinafter second circuit loop for abbreviation) consisted of the bell 382, power supply 384 and the cables 46-48, and becomes a shutdown status (not ring). When the doorbell signal is triggered, the traditional doorbell switcher 380 configures the first circuit loop to broken circuit according to the doorbell signal so as to make bell 382 retrieve the power from the power supply 384 via the second circuit loop and ring.

Because the doorbell trigger 1 of the present disclosed example can directly apply to the existing traditional doorbell switcher and bell, the present disclosed example can effectively save the cost of upgrading the doorbell.

Figure 4:
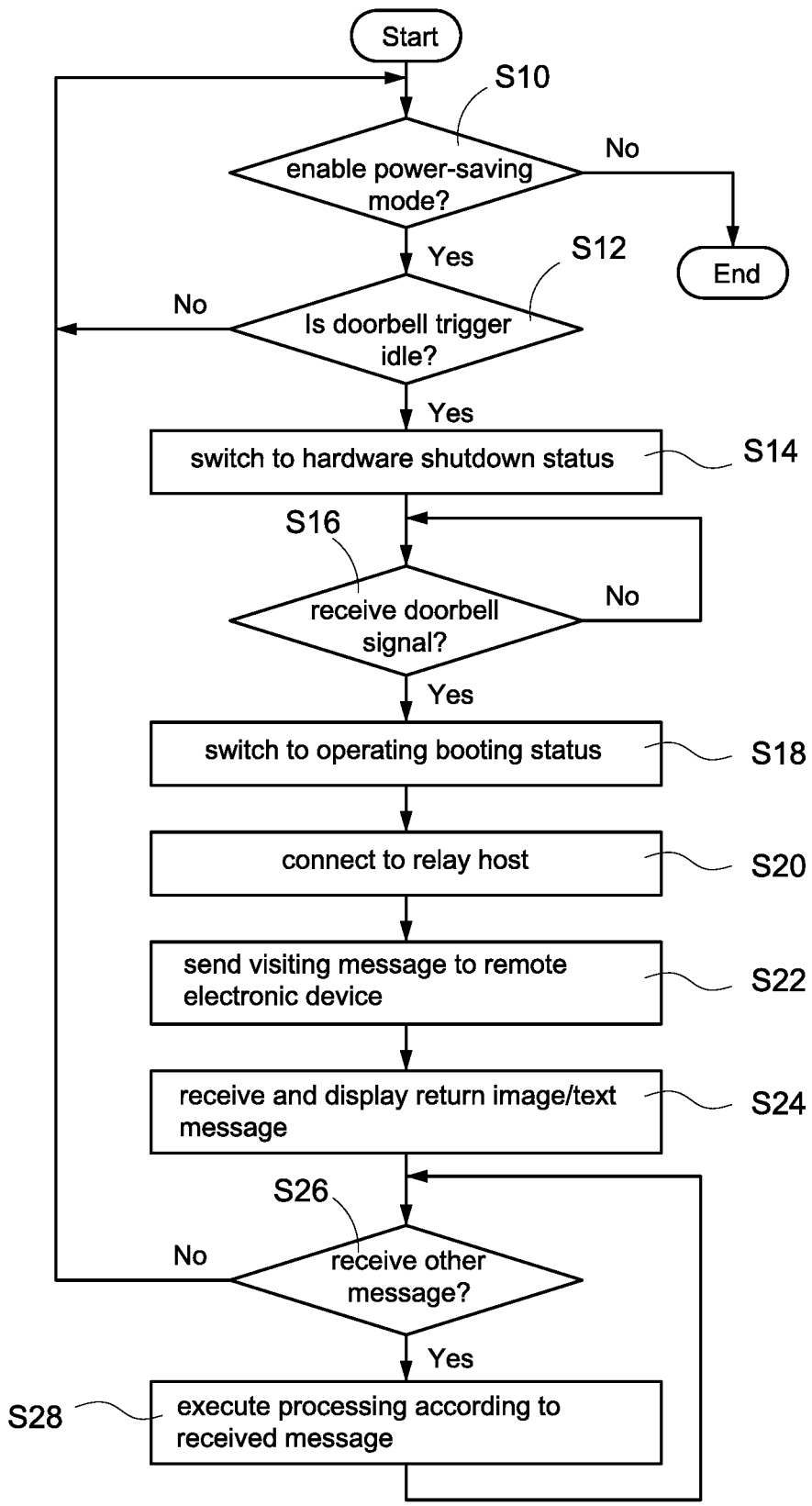
FIG. 4 is a flowchart of a doorbell-triggering method according to a first embodiment of the present disclosed example.

Please refer to FIG. 4, which illustrates a flowchart of a doorbell-triggering method according to a first embodiment of the present disclosed example. The doorbell-triggering method in this embodiment is mainly implemented by the doorbell trigger as illustrated in FIG. 1 to FIG. 3. The doorbell-triggering method of this embodiment comprises following steps.

Step S10: the micro-controller unit 106 of the doorbell trigger 1 determines whether a power-saving mode is enabled. More specifically, the household can operate the remote electronic device 32 to execute the computer program 320 for connecting to the doorbell trigger 1 and controlling the doorbell trigger 1 to enter/leave the power-saving mode. Thus, the household can arbitrarily enable/disable the power-saving mode according to the household's requirement, and get better user experience.

If the micro-controller unit 106 determines that the power-saving mode is enabled, performs the step S12. Otherwise, the micro-controller unit 106 terminates the doorbell-triggering method.

Step S12: the micro-controller unit 106 determines whether the doorbell trigger 1 is idle. If the micro-controller unit 106 determines that the doorbell trigger 1 is idle currently, performs the step S14. Otherwise, the micro-controller unit 106 performs the step S10 again.

Step S14: the micro-controller unit 106 controls the doorbell trigger 1 to switch to the hardware shutdown status for reducing the power consumption when determining that the doorbell trigger 1 is idle.

Preferably, the micro-controller unit 106 is to switch off the processor clock of the doorbell trigger 1 and reduce voltage supply so as to control the doorbell trigger 1 to switch to the hardware shutdown status.

Step S16: the micro-controller unit 106 detects whether it receives the doorbell signal from the button unit 102 under the hardware shutdown status. If the micro-controller unit 106 receives the doorbell signal, performs the step S18. Otherwise, the micro-controller unit 106 performs the step S16 again.

Step S18: the micro-controller unit 106 controls the doorbell trigger 1 to switch to the operating booting status from the hardware shutdown status when receiving the doorbell signal under the hardware shutdown status.

Step S20: the micro-controller unit 106 connects to the relay host 30 via the network unit 100 and the Internet 2.

Step S22: the micro-controller unit 106 sends the visiting message to the connected relay host 30 so as to make the relay host 30 forward the visiting message to the remote electronic device 32.

Step S24: the micro-controller unit 106 receives the return image/text message from the relay host 30, and displays the received return image/text message on the display unit 104.

Preferably, the micro-controller unit 106 receives the return image/text message sent by the household from the remote electronic device 32 via the relay host 30.

Preferably, above-mentioned return image/text message comprises the communication service message indicating the visitor that using the communication service to communicate with the remote electronic device 32.

For example, above-mentioned communication service is a web real-time communication service, above-mentioned communication service message comprises the web address of the instant messaging service for connecting to the web real-time communication service and the verification codes for verification in the web real-time communication service.

Step S26: the micro-controller unit 106 detects whether it receives other message from the relay host 30, such as other return image/text message or control message.

If the micro-controller unit 106 detects that the doorbell trigger 1 has received other message from the relay host 30, performs the step S28. Otherwise, the micro-controller unit 106 performs the step S10 again.

Step S28: the micro-controller unit 106 executes corresponded processing according to the received message.

For example, if the received message is an image/text message (such as another image/text message), the micro-controller unit 106 can display the received message on the display unit 104. If the received message is a control message (such as message of disabling the power-saving mode or message of switching on an external device), the micro-controller unit 106 can execute the corresponded control operation (such as disabling the power-saving mode or switching on the external device).

Figure 5:
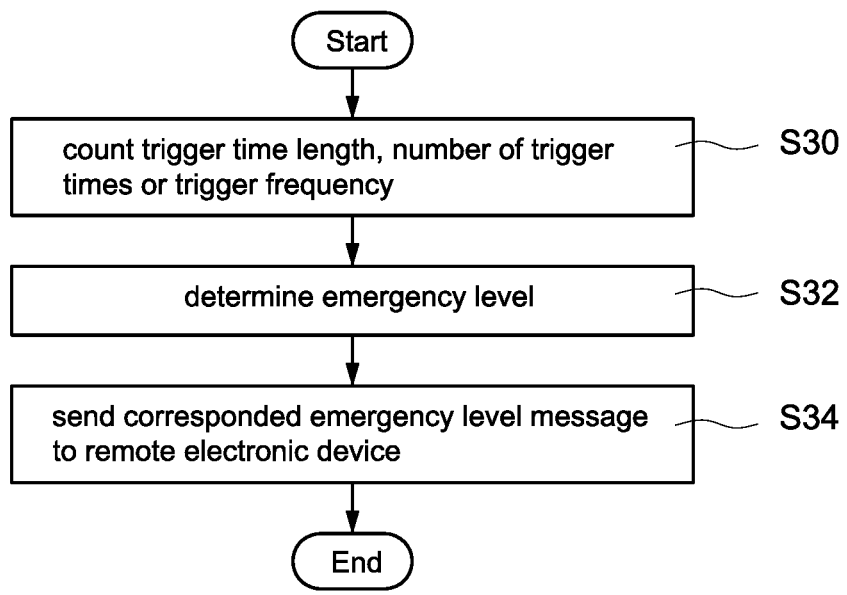
FIG. 5 is a partial flowchart of a doorbell-triggering method according to a second embodiment of the present disclosed example.

Please refer to FIG. 5, which illustrates a partial flowchart of a doorbell-triggering method according to a second embodiment of the present disclosed example. In comparison with the first embodiment shown in the FIG. 4, in the doorbell-triggering method of this embodiment, the doorbell trigger 1 can simultaneously performs following steps when receiving the doorbell signal (step S16).

Step S30: the micro-controller unit 106 counts the trigger time length of the doorbell signal being continuously triggered, or counting the number of trigger times or the trigger frequency of the doorbell signal being continuously triggered during the trigger time interval.

Step S32: the micro-controller unit 106 determines the emergency level according to the trigger time length, the number of trigger times or the trigger frequency.

Step S34: the micro-controller unit 106 sends the emergency level message corresponding to the emergency level, the trigger time length, the number of trigger times, or the trigger frequency to the remote electronic device 32 via the relay host 30.

Figure 6:
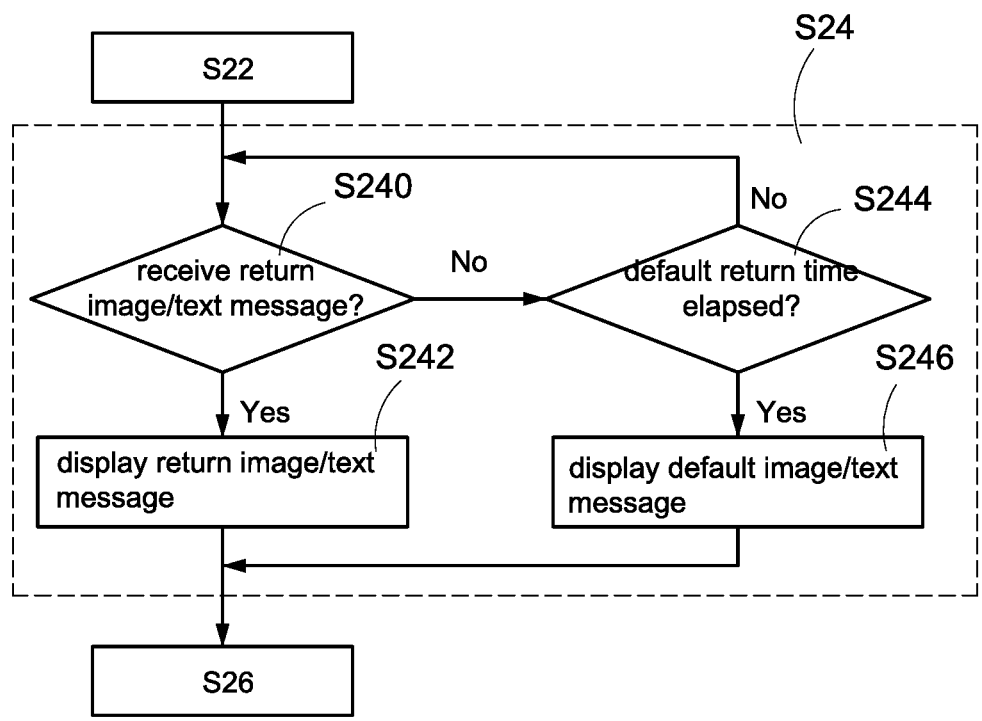
FIG. 6 is a partial flowchart of a doorbell-triggering method according to a third embodiment of the present disclosed example.

Please refer to FIG. 6, which illustrates a partial flowchart of a doorbell-triggering method according to a third embodiment of the present disclosed example. In comparison with the first embodiment shown in the FIG. 4, the doorbell-triggering method of this embodiment further comprises following steps.

Step S240: the micro-controller unit 106 determines whether it receives the return image/text message. If the micro-controller unit 106 determines that the doorbell trigger 1 has received the return image/text message, performs the step S242. Otherwise, the micro-controller unit 106 performs the step S244.

Step S242: the micro-controller unit 106 displays the received return image/text message on the display unit 104.

Step S244: the micro-controller unit 106 determines whether the default return time (such as 5 seconds) elapses via using the timer 108 to count. If the micro-controller unit 106 determines that the default return time has elapsed, performs the step S246. Otherwise, the micro-controller unit 106 performs the step S240 again.

Step S246: the micro-controller unit 106 retrieves the pre-stored default image/text message, and displays the default image/text message on the display unit 104.

Figure 7:
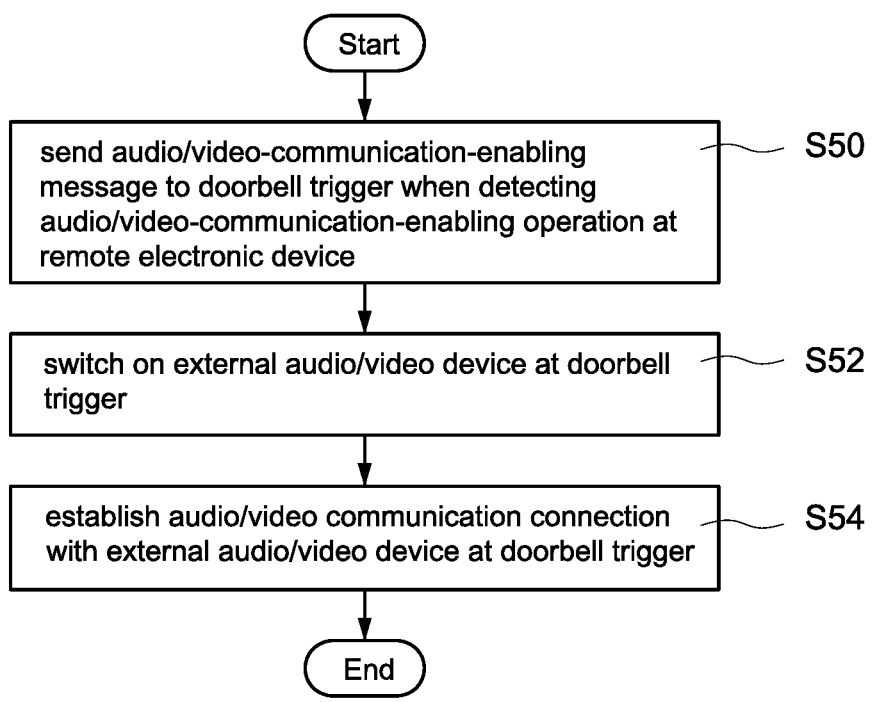
FIG. 7 is a partial flowchart of a doorbell-triggering method according to a forth embodiment of the present disclosed example.

Please refer to FIG. 7, which illustrates a partial flowchart of a doorbell-triggering method according to a forth embodiment of the present disclosed example. Compare with the first embodiment shown in the FIG. 4, the doorbell-triggering method of this embodiment further comprises the steps S50-S54 used to implement a remote control function.

Step S50: the computer program 320 of the remote electronic device 32 controls the remote electronic device 32 to send the audio/video-communication-enabling message to the doorbell trigger 1 via the relay host 30 when detecting the audio/video-communication-enabling operation inputted by the household.

Step S52: the doorbell trigger 1 controls the external audio/video device 34 to switch on according to the received audio/video-communication-enabling message.

Step S54: the computer program 320 of the remote electronic device 32 controls the remote electronic device 32 to establish the audio/video communication connection with the external audio/video device 34 so as to implement the instant video conferencing.

Thus, the household can make the doorbell trigger as a gateway to remote control the external audio/video device so as to implement the remote booting function of the external device.

The above mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A doorbell-triggering method, comprising:
   a) controlling a doorbell trigger to switch to a hardware shutdown status when detecting the doorbell trigger is idle;
   b) controlling the doorbell trigger to switch to an operating booting status and connect to a relay host when receiving a doorbell signal from a button unit of the doorbell trigger under the hardware shutdown status;
   c) sending a visiting message to a remote electronic device via the relay host;
   d) receiving a return image/text message from the relay host and displaying the return image/text message on a display unit of the doorbell trigger; and
   e) displaying a default image/text message when the doorbell trigger didn't receive the return image/text message for a default return time since the visiting message was sent.

2. The doorbell-triggering method as claim 1, wherein the step a) is to switch off a processor clock of the doorbell trigger and reduce voltage supply for controlling the doorbell trigger to switch to the hardware shutdown status.

3. The doorbell-triggering method as claim 1, wherein the method comprises following steps after the step b:
   f) counting a trigger time length of the doorbell signal being continuously triggered, or counting the number of trigger times or a trigger frequency of the doorbell signal being continuously triggered during a trigger time interval;
   g) determining an emergency level according to the trigger time length, the number of trigger times or the trigger frequency; and
   h) sending the trigger time length, the number of trigger times, the trigger frequency or an emergency level message corresponding to the emergency level to the remote electronic device via the relay host.

4. The doorbell-triggering method as claim 1, wherein the return image/text message comprises a communication service message indicating a visitor that using a communication service to communicate with the remote electronic device.

5. The doorbell-triggering method as claim 4, wherein the communication service is a web real-time communication service, the communication service message comprises a web address of an instant messaging service for connecting to the communication service and a plurality of verification codes for verification in the communication service.

6. The doorbell-triggering method as claim 1, wherein the method further comprises:
  i) a computer program of the remote electronic device controlling the remote electronic device to send an audio/video-communication-enabling message to the doorbell trigger via the relay host when detecting an audio/video-communication-enabling operation;
  j) controlling an external audio/video device to switch on at the doorbell trigger when receiving the audio/video-communication-enabling message; and
  k) the computer program of the remote electronic device controlling the remote electronic device to establish an audio/video communication connection with the external audio/video device via the doorbell trigger.

* * * * *